US008019449B2

(12) United States Patent
Barzegar et al.

(10) Patent No.: US 8,019,449 B2
(45) Date of Patent: Sep. 13, 2011

(54) SYSTEMS, METHODS, AND DEVICES FOR PROCESSING AUDIO SIGNALS (75) Inventors: Farhad Barzegar, Branchburg, NJ (US); Irwin Gerszberg, Kendall Park, NJ (US); Scott J. Mollica, Red Bank, NJ (US); Thomas W. Hill, Oviedo, FL (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1456 days.

(21) Appl. No.: 10/980,056

(22) Filed: Nov. 3, 2004

(65) Prior Publication Data

US 2006/0034300 A1    Feb. 16, 2006

Related U.S. Application Data (60) Provisional application No. 60/516,928, filed on Nov. 3, 2003.

(51) Int. Cl.
    *G06F 17/00* (2006.01)
(52) U.S. Cl. .......................................................... 700/94
(58) Field of Classification Search ...................... 700/94
    See application file for complete search history.

(56) References Cited

U.S. PATENT DOCUMENTS

| 5,610,903 | A  | * | 3/1997 | Crayford ........................ 370/213 |
| 5,867,495 | A  | * | 2/1999 | Elliott et al. .................. 370/352 |
| 6,173,062 | B1 |   | 1/2001 | Dibachi |
| 6,185,288 | B1 |   | 2/2001 | Wong |
| 6,252,869 | B1 | * | 6/2001 | Silverman ..................... 370/352 |
| 6,359,923 | B1 | * | 3/2002 | Agee et al. ..................... 375/130 |
| 6,400,822 | B1 | * | 6/2002 | Anozie .......................... 379/398 |
| 6,457,051 | B1 | * | 9/2002 | Riddle et al. .................. 709/224 |
| 6,560,201 | B1 |   | 5/2003 | Amann |
| 6,643,650 | B1 | * | 11/2003 | Slaughter et al. ............... 707/10 |
| 6,757,363 | B1 | * | 6/2004 | Platt et al. ................... 379/88.11 |
| 6,778,649 | B2 |   | 8/2004 | Hinderks |
| 6,782,367 | B2 |   | 8/2004 | Vainio |
| 6,785,267 | B1 |   | 8/2004 | Knappe |
| 6,882,335 | B2 | * | 4/2005 | Saarinen ....................... 345/156 |
| 6,920,210 | B2 | * | 7/2005 | DeNies et al. ........... 379/201.01 |

(Continued)

FOREIGN PATENT DOCUMENTS

EP    1024638 A    8/2000

(Continued)

OTHER PUBLICATIONS

Kumar, Vineet, IP Telephony with H.323: Architectures for Unified Networks and Integrated Services, Jan. 1, 2001, pp. 20-23, 75, 515-516, and 544. XP002366862, ISBN 0-471-39343-6, John Wiley & Sons, US.

(Continued)

*Primary Examiner* — Curtis Kuntz
*Assistant Examiner* — Paul McCord
(74) *Attorney, Agent, or Firm* — Akerman Senterfitt; Michael K. Dixon (57) ABSTRACT Certain exemplary embodiments provide a method comprising a plurality of activities, comprising: initiating a communications connection between an audio device and a CPE gateway coupled to the audio device, the CPE gateway coupleable to a network; and negotiating between the audio device and the CPE gateway for a parameter associated with processing an audio signal to be transmitted across the network, the audio signal corresponding to a selected audio bandwidth from a plurality of audio bandwidths.

22 Claims, 5 Drawing Sheets

U.S. PATENT DOCUMENTS

| | | | |
|---|---|---|---|
| 6,965,614 B1* | 11/2005 | Osterhout et al. | 370/466 |
| 6,988,147 B2* | 1/2006 | King | 709/239 |
| 7,006,624 B1* | 2/2006 | Philipsson et al. | 379/388.03 |
| 7,023,839 B1 | 4/2006 | Shaffer | |
| 7,146,341 B1 | 12/2006 | Light | |
| 7,228,158 B2* | 6/2007 | Lee et al. | 455/575.3 |
| 7,248,675 B2* | 7/2007 | Mirashrafi et al. | 379/88.13 |
| 7,382,868 B2* | 6/2008 | Moore et al. | 379/114.01 |
| 7,428,308 B2 | 9/2008 | Jones | |
| 7,450,726 B2* | 11/2008 | Goyal | 381/74 |
| 7,483,543 B2* | 1/2009 | Cranfill et al. | 381/334 |
| 2001/0044712 A1 | 11/2001 | Vainio | |
| 2002/0044645 A1* | 4/2002 | Ryan et al. | 379/433.02 |
| 2002/0085517 A1* | 7/2002 | Lee et al. | 370/331 |
| 2002/0137478 A1* | 9/2002 | Masamura | 455/90 |
| 2003/0039364 A1 | 2/2003 | Fujita | |
| 2003/0061361 A1* | 3/2003 | Bacik et al. | 709/228 |
| 2003/0065803 A1* | 4/2003 | Heuvelman | 709/231 |
| 2003/0065952 A1* | 4/2003 | Otsuka | 713/201 |
| 2003/0088327 A1 | 5/2003 | Taori | |
| 2003/0093563 A1* | 5/2003 | Young et al. | 709/245 |
| 2003/0161453 A1* | 8/2003 | Veschi | 379/93.05 |
| 2003/0194968 A1 | 10/2003 | Young | |
| 2003/0204642 A1* | 10/2003 | Sanders et al. | 709/313 |
| 2003/0224780 A1 | 12/2003 | Rodman | |
| 2004/0024580 A1* | 2/2004 | Salmonsen et al. | 703/27 |
| 2004/0049797 A1* | 3/2004 | Salmonsen | 725/132 |
| 2004/0087346 A1* | 5/2004 | Johannsen et al. | 455/566 |
| 2005/0004803 A1 | 1/2005 | Smeets | |
| 2005/0013309 A1* | 1/2005 | Ravishankar et al. | 370/401 |
| 2005/0021716 A1* | 1/2005 | Adamczyk et al. | 709/223 |
| 2005/0068572 A1* | 3/2005 | Hart et al. | 358/1.15 |
| 2005/0108247 A1* | 5/2005 | Heinla et al. | 707/10 |
| 2005/0108331 A1* | 5/2005 | Osterman | 709/205 |
| 2005/0122965 A1* | 6/2005 | Heinla et al. | 370/357 |
| 2005/0131558 A1* | 6/2005 | Braithwaite et al. | 700/94 |

FOREIGN PATENT DOCUMENTS

| | | |
|---|---|---|
| EP | 1059782 | 12/2000 |
| EP | 1326359 | 7/2003 |
| WO | WO97/15983 | 5/1997 |
| WO | WO2004/034376 | 4/2004 |

OTHER PUBLICATIONS

Polycom, "Siren/G.722.1 FAQ's", http://www.polycom.com/common/pw_cmp_printScreen/0,,pw-1234,FF.html09-02-2006, Jan. 1, 2000, 6 pages, XP002366863.

International Telecommunication Union, "Series H: Audiovisual and Multimedia Systems—ITU-T Rec. H.323 (Jul. 2003) Packet-based multimedia communications systems", Jul. 1, 2003, 298 pages.

* cited by examiner

SYSTEMS, METHODS, AND DEVICES FOR PROCESSING AUDIO SIGNALS

CROSS-REFERENCES TO RELATED APPLICATIONS

This application claims priority to, and incorporates by reference herein in its entirety, pending U.S. Provisional Patent Application Ser. No. 60/516,928, filed 3 Nov. 2003.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

When the following terms are used herein, the accompanying definitions apply:

across the network—through at least one link coupling nodes comprised by a network.

adapted to—made suitable or fit for a specific use or situation.

apparatus—an appliance or device for a particular purpose audio—of or relating to humanly audible sound.

audio bandwidth—a range of frequencies defined by its highest and lowest limits and typically audible to a human with substantially normal hearing function. Each limit is typically measured as a frequency (in cycles per second, or hertz).

audio device—an apparatus adapted to convert audible sound to an electrical signal, an audio recording to an electrical signal, an electrical signal to audible sound, and/or an electrical signal to an audio recording, such as an acoustic transducer, microphone, audio player, speaker, telephone, audio recorder, CD player, DVD recorder, etc.

audio signal—an electrical, electromagnetic, and/or optical signal representing audible sound.

bit rate—a ratio of the number of bits that are transferred between devices in a specified amount of time, typically one second.

can—is capable of, in at least some embodiments.

coder/decoder (codec)—a set of instructions, implemented in hardware, firmware, and/or software, that converts digital signals to and from analog according to a given audio file format or streaming audio format. In certain embodiments, an audio codec can utilize a variable or constant bit rate, and/or correspond to any appropriate standard, such as G.711, G.722, G.723.1, G729A, MPEG1 Layer II, MPEG1 Layer III, Dolby A, Dolby AC-2, Dolby Fax, Dolby AC-3, Dolby Digital, Dolby Digital 5.1, Dolby Surround Pro-Logic, Dolby Digital EX, THX Surround EX, DTS, DTS-ES, DTS-ES Discrete 6.1, APT-X, 3D2, APT-XE, MPEG-2 AAC, MP3, MP3 Pro, MPEG-4, AAC, DivX, CD Audio, DVD Audio, WAV, WMA, Windows Media Audio, RealAudio, Ogg Vorbis, ATRAC, FLAC, Speex, Shorten, and/or Monkey's Audio Compressor, etc.

communications connection—a channel of communications that is not necessary a direct physical link.

compress—providing and/or storing data in a format that requires less space than usual.

comprising—including but not limited to.

constant bit rate—a bit rate that does not vary with time.

convert—to translate from a digital form to an analog form.

coupleable—capable of being joined, connected, and/or linked together.

customer premises equipment (CPE)—telecommunications equipment that resides on the premises of a telecommunications user who is not a provider of telecommunications services.

data—distinct pieces of information, usually formatted in a special or predetermined way and/or organized to express concepts.

decompress—to restore to uncompressed form; to reverse the effects of data compression.

digitize—to translate from an analog form to a digital form. For example, optical scanners digitize images by translating them into bit maps. It is also possible to digitize audio, video, and/or any type of movement. In all these cases, digitization is performed by sampling at discrete intervals. To digitize audio, for example, a device measures a sound wave's amplitude many times per second. These numeric values can then be recorded digitally.

gateway—a device connected to a network for performing code and/or protocol conversion processes. An entrance and exit into a network.

input/output (I/O) device—the input/output (I/O) device of the information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

may—is allowed to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

negotiate—to confer with one or more other devices in order to determine and/or reach an agreement regarding one or more parameters.

negotiated parameter—a negotiation-determined variable and/or its value.

negotiation-determined—a parameter arrived at via negotiation.

network—a communicatively coupled plurality of nodes.

network interface—any device, system, or subsystem capable of coupling an information device to a network.

For example, a network interface can be a telephone, cellular phone, cellular modem, telephone data modem, fax modem, wireless transceiver, ethernet card, cable modem, digital subscriber line interface, bridge, hub, router, or other similar device.

node—a communication device within a network that is coupled to another node within the network via a link. A CPE gateway is not considered a node.

parameter—a variable and/or its value. Examples include a rate, measure, length, protocol, format, etc.

plurality—the state of being plural and/or more than one.

predetermined—established in advance.

processing—v. to put through the steps of a predetermined procedure, such as a procedure for sampling, digitizing, formatting, encoding, compressing, encrypting, transmitting, receiving, decrypting, decompressing, decoding, and/or converting, etc.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can be a central processing unit, a local controller, a remote controller, parallel controllers, and/or distributed controllers, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to make available; to supply; to prepare.

publicly switched telephone network (PSTN)—the interconnected system of telephone switches and lines used for telecommunication services.

receive—to take or acquire something provided.

sample—to repeatedly measure, such as at discrete time intervals.

substantially—to a great extent or degree.

system—a collection of mechanisms, devices, data, and/or instructions, the collection designed to perform one or more specific functions.

telecommunications—the science and technology of communication at a distance by electronic transmission of impulses.

telephone—an instrument that converts voice and other audio signals into a form that can be transmitted to remote locations and that receives and reconverts information from a transmittable form into voice and other audio signals.

telephony—the art or process of transmitting speech at a distance.

transmit—to send.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

variable bit rate—a bit rate that does vary with time.

DETAILED DESCRIPTION

The sounds produced in human speech contain frequencies that typically lie within the frequency band of approximately 100 Hz to approximately 8,000 Hz. The range of frequencies that can be detected (heard) by the human ear are normally considered to lie within the range of approximately 20 Hz to approximately 20,000 Hz. Yet, in traditional telephony systems, such as Plain Old Telephone Systems (POTS) or systems utilizing G.711, voice input to a telephone microphone is filtered to an approximately 3.1 kHz band, spanning from about 300 Hz to about 3400 Hz, which includes guard bands. Thus, traditional telephony ignores substantial ranges of human-perceptible sound.

The reduction in sound quality over the telephone and/or telephony systems has many potential downsides. For example, in normal telephone conversation, sounds or portions of words spoken can be dropped or lost via the low audio bandwidth (approximately 3.1 kHz) provided by the telephone network. These kinds of disturbances can hinder the enjoyment of the conversation. In many languages, small sound nuances can provide different meanings and reduced sound quality and/or audio bandwidth can reduce the capability of hearing and understanding the speaker. Moreover, when the audio signal is comprised of sounds other than speech, such as music, environmental sounds, etc., the reduction in quality and/or enjoyment caused by relatively low audio bandwidth can be substantial.

In certain novel approaches, an enhanced audio bandwidth can be provided by the sender and/or to the receiver. Prior to the connection of a call, customer premises equipment (CPE), such as a wired, wireless, telephone, IP, and/or ATM network gateway, can negotiate with the network for a rate and/or other parameter associated with digitizing and/or processing sound for end-to-end transmission of the digitized sound via the network and/or for a rate and/or other parameter associated with receiving, converting, and/or processing digitized sound from the network in an end-to-end transmission.

Upon wired and/or wireless coupling of a sound device (such as an acoustic transducer, microphone, audio player, speaker, telephone, audio recorder, CD player, DVD recorder, etc.) to a CPE, the sound device can communicate with the CPE so that a rate and/or other parameter associated with digitizing, transmitting, receiving, and/or processing audio signals can be determined. The communication can take the form of a query by the CPE, a message from the sound device, and/or a negotiation therebetween, etc. The CPE can comprise an integrated gateway and one or more sound devices, such as a telephone. The CPE can be "plug-and-play", so that it can be plugged into the network and be ready for use as an intelligent telephone.

The CPE gateway can utilize an audio codec utilizing a variable or constant bit rate, and/or corresponding to any appropriate standard, such as, for example, G.711, G.722, G.723.1, G729A, MPEG1 Layer II, MPEG1 Layer III, Dolby A, Dolby AC-2, Dolby Fax, Dolby AC-3, Dolby Digital, Dolby Digital 5.1, Dolby Surround Pro-Logic, Dolby Digital EX, THX Surround EX, DTS, DTS-ES, DTS-ES Discrete 6.1, APT-X, 3D2, APT-XE, MPEG-2 AAC, MP3, MP3 Pro, MPEG-4, AAC, DivX, CD Audio, DVD Audio, WAV, WMA, Windows Media Audio, RealAudio, Ogg Vorbis, ATRAC, FLAC, Speex, Shorten, and/or Monkey's Audio Compressor, etc. These codecs can utilize, for example 8, 10, 12, 14, 16, 20, 24, 28, 32, and/or 36-bit sampling, at sampling rates ranging from approximately 8 kHz to approximately 100 kHz, including all values and subranges therebetween, such as approximately 8 kHz, approximately 12 kHz and higher, and/or approximately 14 kHz and higher, such as approximately 32 kHz, 44.1 kHz, 48 kHz, etc.

For audio transmissions that originate as analog audio signals, to assist in reconstructing the original analog audio signal at the receiving end of a transmission, the Nyquist criterion can be used to determine a sampling rate that is at least twice as fast as the highest frequency component in the input signal.

Potentially relevant additional information is presented in pending U.S. patent application Ser. No. 09/694,210, filed on Oct. 23, 2000, which is incorporated herein by reference in its entirety.

In certain exemplary and/or novel approaches and/or embodiments, an apparatus is provided that comprises: a CPE gateway coupleable to a network and to an audio device, the CPE gateway adapted to negotiate with the network regarding a parameter associated with processing an audio signal to be transmitted across the network, the transmitted audio signal corresponding to a selected audio bandwidth from a plurality of audio bandwidths, the selected audio bandwidth associated with the parameter, the plurality of audio bandwidths comprising a first audio bandwidth of approximately 3.1 kHz and a second audio bandwidth of at least approximately 6 kHz.

Certain exemplary embodiments provide a method comprising a plurality of activities, comprising: initiating a communications connection between a CPE gateway and a network coupled to the CPE gateway, the CPE gateway coupleable to an audio device; and negotiating between the CPE gateway and the network for a parameter associated with processing an audio signal to be transmitted across the network. In certain exemplary embodiments, the transmitted audio signal can correspond to a selected audio bandwidth from a plurality of audio bandwidths, the selected audio bandwidth associated with the parameter, the plurality of audio bandwidths comprising a first audio bandwidth of approximately 3.1 kHz and a second audio bandwidth of at least approximately 6 kHz.

Certain exemplary embodiments provide an apparatus comprising: an audio device coupleable to a CPE gateway that is coupleable to a network, the audio device adapted to negotiate with the CPE gateway regarding a parameter associated with processing an audio signal to be transmitted across the network. In certain exemplary embodiments, the transmitted audio signal can correspond to a selected audio bandwidth from a plurality of audio bandwidths, the selected audio bandwidth associated with the parameter, the plurality of audio bandwidths comprising a first audio bandwidth of approximately 3.1 kHz and a second audio bandwidth of at least approximately 6 kHz.

Certain exemplary embodiments provide a method comprising a plurality of activities, comprising: initiating a communications connection between an audio device and a CPE gateway coupled to the audio device, the CPE gateway coupleable to a network; and negotiating between the audio device and the CPE gateway for a parameter associated with processing an audio signal to be transmitted across the network. In certain exemplary embodiments, the transmitted audio signal can correspond to a selected audio bandwidth from a plurality of audio bandwidths, the selected audio bandwidth associated with the parameter, the plurality of audio bandwidths comprising a first audio bandwidth of approximately 3.1 kHz and a second audio bandwidth of at least approximately 6 kHz.

Certain exemplary embodiments provide an apparatus comprising: a CPE gateway coupleable to a network and to an audio device, the CPE gateway adapted to negotiate with the audio device regarding a parameter associated with processing an audio signal to be transmitted across the network. In certain exemplary embodiments, the transmitted audio signal can correspond to a negotiated one of a plurality of audio bandwidths, the plurality of audio bandwidths comprising a first audio bandwidth of approximately 3.1 kHz and a second audio bandwidth of at least approximately 6 kHz.

Certain exemplary embodiments provide a method comprising a plurality of activities, comprising: via a CPE gateway: initiating a communications connection between an audio device coupled to the CPE gateway and a network coupled to the CPE gateway; and negotiating on behalf of the audio device with the network for a parameter associated with processing an audio signal to be transmitted across the network. In certain exemplary embodiments, the transmitted audio signal can correspond to a selected audio bandwidth from a plurality of audio bandwidths, the selected audio bandwidth associated with the parameter, the plurality of audio bandwidths comprising a first audio bandwidth of approximately 3.1 kHz and a second audio bandwidth of at least approximately 6 kHz.

Figure 1:
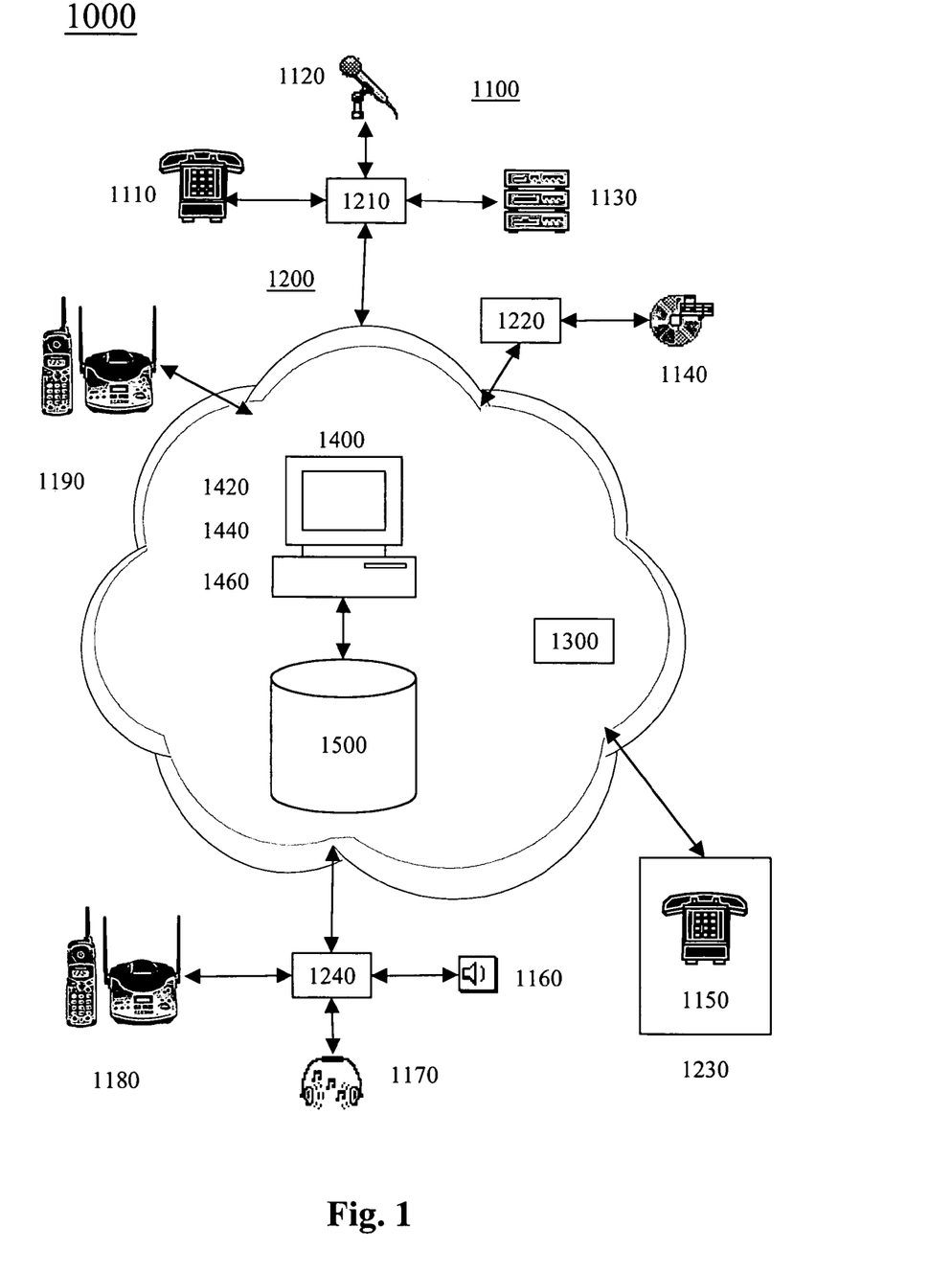
FIG. 1 is a block diagram of an exemplary embodiment of a system 1000.

FIG. 1 is a block diagram of an exemplary embodiment of a system 1000, which can comprise an audio device 1100, such as a corded telephone 1110, microphone 1120, audio gear (instrument, MIDI component, receiver, player, amplifier, equalizer, conditioner, sampler, recorder, etc.) 1130, audio player/recorder 1140 (which can comprise video capabilities as well), integrated telephone 1150, speaker 1160, headphones 1170, and/or cordless telephones 1180, 1190, etc. Any audio device 1100 can comprise an acoustic transducer. An audio device can be capable of generating, transmitting, receiving, processing, and/or playing an audio signal having an audio bandwidth of from approximately 3.1 kHz to approximately 48 kHz, including all values and subranges therebetween.

If utilized as a telephone, audio device 1100 can comprise a handset that includes a plurality of speaker elements placed in different locations on the handset. The location of the speaker elements can be chosen so as to be advantageous for purposes of the user's auditory experience. For example, one speaker can be positioned in the traditional "listening" portion of the handset while a second speaker can be positioned on the opposing side of the handset. Alternatively, the speakers can be positioned next to one another but provided with directionality that hits the inside of the user's ear from different angles. The size and nature of each speaker element does not need to be uniform. For example, one of the speaker elements can act as the equivalent of a bass booster or as a sub-woofer. Different speaker elements, provided with enough bandwidth, can be utilized to reproduce the equivalent of 5.1 or 6.1 sound. The speaker elements provided in the handset can be of sufficient quality to enable the transmission of the high-quality and/or high audio bandwidth voice signal.

Audio device 1100, CPE gateway 1200 (as further described below), and/or network 1300 (as further described below) can enable voice and/or audio signals to be coded, transmitted, received, and/or processed at a higher sampling rate with a higher number of bits per sample to, inter alia, increase the potential dynamic range, expand the frequency response, and/or improve the signal-to-noise ratio, etc.

Certain audio devices, such as 1110, 1120, 1130, 1140, 1150, 1160, 1170, and 1180 can be coupled via a CPE gateway 1200, such as CPE gateways 1210, 1220, 1230, 1240, to a telecommunications network 1300. In certain embodiments, a CPE gateway 1230 can be integrated with an audio device 1150.

Network 1300 can be a telecommunications network, a telephone network, and/or a PSTN. Network 1300 can be a broadband network, which can utilize any of a variety of technologies, such as, for example, ISDN, cable, digital subscriber line, Ti, wireless, etc. Higher level audio protocols utilized on and/or over network 1300 can include Voice over IP (VoIP), Voice over ATM (VoATM), and/or Voice over Frame Relay (VoFR), etc.

Network 1300 can comprise one or more network nodes 1400, such as a switch, softswitch, router, server, etc., any of which can be coupled to and/or integrate a database 1500. Any network node 1400 can comprise a user interface 1420 adapted to allow a network administrator to manage network node 1400. Any network node 1400 can comprise a server module 1440 adapted to respond to and/or initiate requests for data, files, transmissions, connections, and/or services, such as negotiation services. Any network node 1400 can comprise a negotiation module 1460 adapted to negotiate with nodes within network 1300, and/or systems outside network 1300, regarding transmissions across and/or within network 1300, such as transmissions involving audio signals.

A CPE gateway can comprise instructions and/or the capability for negotiating with an audio device 1100 and/or network 1300 and/or one or more nodes 1400 within network 1300 regarding a parameter associated with processing an audio signal to be transmitted across network 1300, the transmitted audio signal corresponding to a selected audio bandwidth, such as an audio bandwidth that is compatible with a sending audio device, e.g., 1120, a sending CPE gateway, e.g., 1210, network 1300, a receiving CPE gateway 1240, and/or a receiving audio device, e.g., 1170 and/or 1190. For example, the selected audio bandwidth can be compatible with (e.g., no larger than) the available audio bandwidth of the device and/or link in the transmission chain having the smallest available audio bandwidth.

Typically, the negotiations will consider the entire transmission, from sending audio device to receiving audio device, and the capabilities, such as audio bandwidth capabilities, of all transmission participants therebetween, including participating network nodes, outside-the-network transmission components, and/or links and/or connections therebetween, etc. Additional parameters and/or factors can be considered in the negotiations, such as quality of service (QOS), latency, jitter, error rates, error correction, redundancy, costs, priorities, channel availability, etc.

Any CPE gateway can have any needed physical port for coupling to an audio device and/or the network. Examples include jacks, connections, and/or ports for POTS, RCA, RJ-11, RJ-45, serial, SCSI, FireWire, Ethernet, broadband, USB, USB2, 802.11, UWB, WiFi, Bluetooth, etc. Any CPE gateway 1200 can have "plug-and-play" capability so that if an audio device supporting a relatively high bandwidth is plugged into a CPE gateway 1200, the audio device, CPE gateway, and/or network immediately negotiate to transmit an audio signal that takes advantage of as much of that high bandwidth as possible, considering the other transmission participants and/or negotiated parameters and/or factors.

Thus, via any CPE gateway 1200, a customer and/or user can connect a legacy low-quality telephony equipment as well as new high-quality and/or higher bandwidth telephony equipment and/or audio devices to the same high-quality voice network. In certain exemplary embodiments, any negotiation described herein can be dynamic and/or responsive to changes in and/or proposed for a transmission participant (including network 1300) and/or links therebetween.

An audio device 1100 and/or a CPE gateway 1200 can comprise one or more audio codecs. Any audio codec can utilize a constant and/or a variable bit rate.

Any CPE gateway 1200 can process, and/or select an audio codec for processing, the audio signal according to the negotiated parameter(s).

Figure 2:
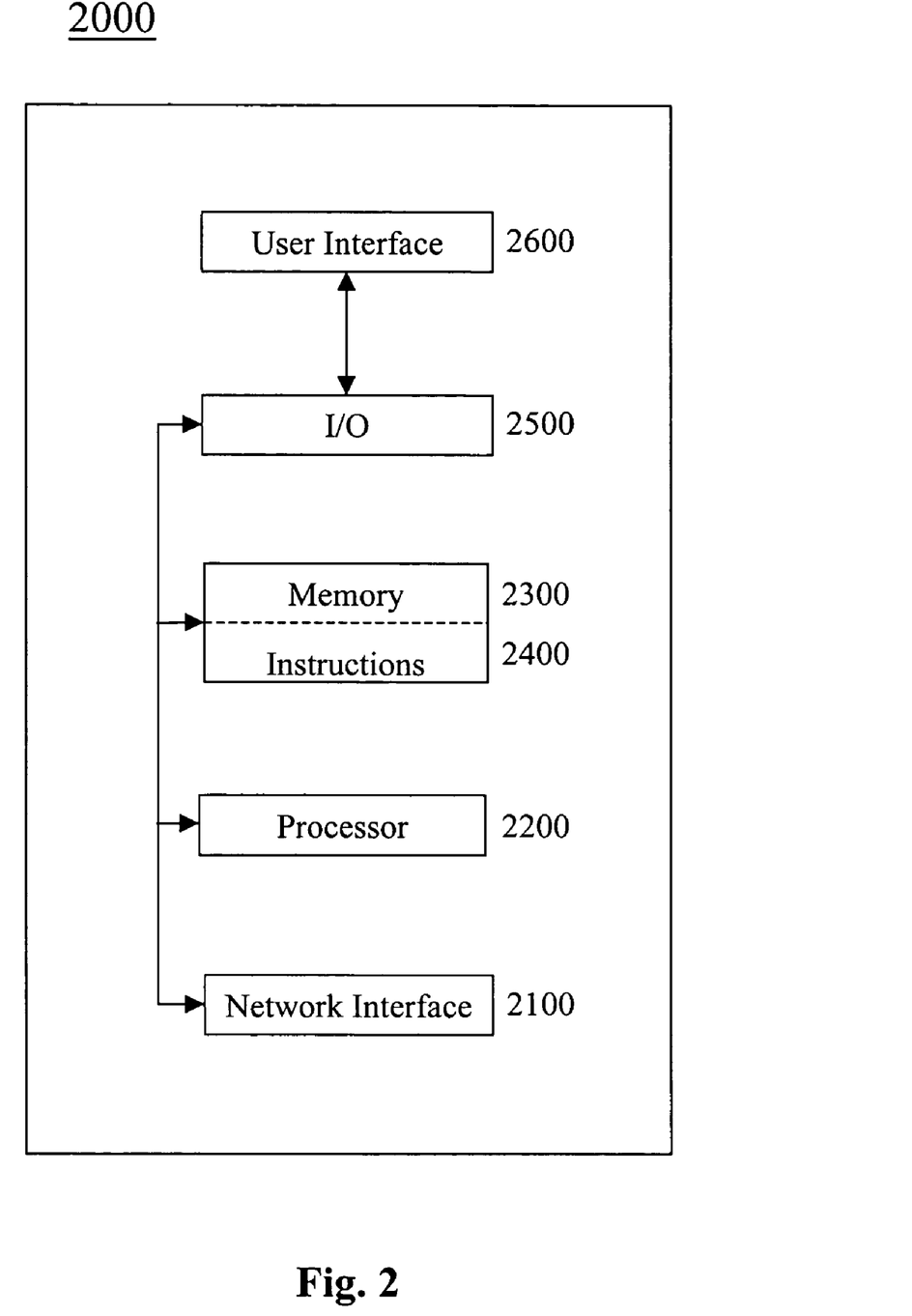
FIG. 2 is a block diagram of an exemplary embodiment of an information device 2000.

FIG. 2 is a block diagram of an exemplary embodiment of an information device 2000, which in certain operative embodiments can comprise, for example, any audio device 1100, CPE gateway 1200, and/or network node 1400 of FIG. 1.

Information device 2000 can comprise any of numerous well-known components, such as for example, one or more network interfaces 2100, one or more processors 2200, one or more memories 2300 containing instructions 2400, one or more input/output (I/O) devices 2500, and/or one or more user interfaces 2600 coupled to I/O device 2500, etc.

In certain exemplary embodiments, via one or more user interfaces 2600, such as a graphical user interface, a user, such as a network administrator, can view a rendering of information related to negotiating audio bandwidth for an audio signal transmitted across a network.

Figure 3:
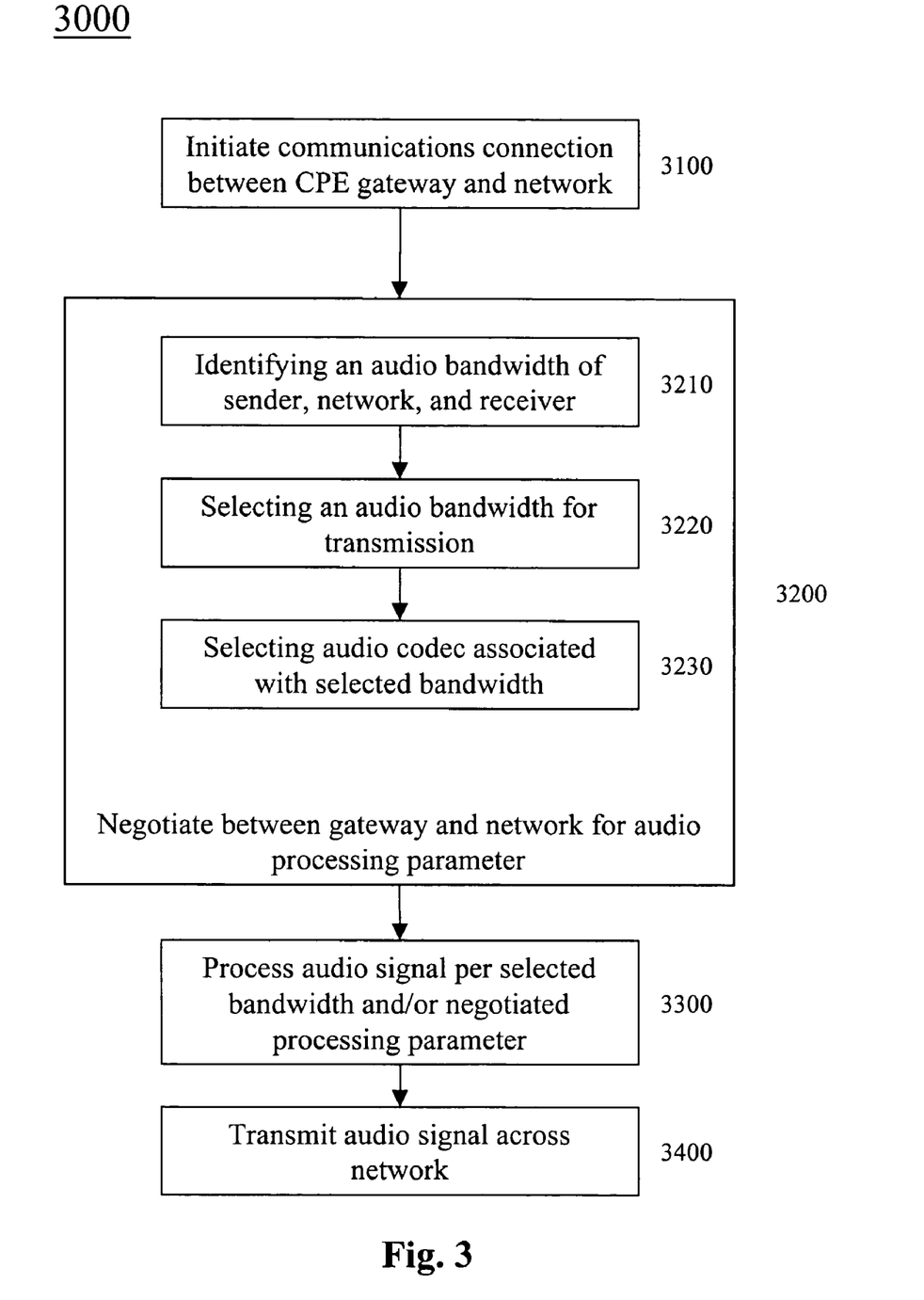
FIG. 3 is a flowchart of an exemplary embodiment of a method 3000.

FIG. 3 is a flowchart of an exemplary embodiment of a method 3000. At activity 3100, communications can be initiated between a CPE gateway and a network. During such initiations, certain capabilities of the CPE gateway and/or network can be identified and/or determined, such as via a subscription mechanism. The CPE gateway and/or network can be associated with authorized users and/or pre-identified capabilities.

At activity 3200, the gateway and the network can negotiate regarding an audio processing parameter and/or a parameter associated with processing an audio signal to be transmitted and/or in transmission across the network. The audio signal can correspond to an audio bandwidth selected from a group of potential audio bandwidths, the group including a bandwidth of approximately 3.1 kHz (which corresponds to the bandwidth of traditional telephony devices and/or CPE's) and a bandwidth of at least approximately 6 kHz. Other potential members of the group can be from approximately 3.1 kHz to approximately 48 kHz, including all values and subranges therebetween, including approximately 7 kHz, 10 kHz, 12 kHz, 15 kHz, 20 kHz, 40 kHz, etc. The negotiated bandwidth can vary with respect to time. By including a bandwidth of approximately 3.1 kHz, the CPE gateway can accommodate a transmission involving a traditional "legacy" CPE audio device, such as a traditional analog telephone. That is, the CPE gateway can help "downshift" the audio signal so that the call becomes like any regular call on the legacy network. Alternatively, the CPE gateway can be responsible for and/or request conversion of the legacy voice signal into a higher-class and/or higher bandwidth signal.

At activity 3210, an audio bandwidth capability of each participant in the transmission (e.g., a sending audio device, sending CPE gateway, nodes of the network, the receiving CPE gateway and/or device, a receiving audio device, and/or links and/or connections therebetween, etc.) can be identified. For example, a CPE gateway can request a particular bandwidth from the network, can ask if that bandwidth is available, and/or can indicate the available bandwidth of the CPE and/or an audio device coupled thereto. As another example, a CPE gateway can identify what kind of quality the coupled audio device can accept, what kind of speaker(s) are available at the audio device, whether the audio device is capable of receiving or transmitting stereo or quadrophonic or 5.1 or 6.1 sound, whether other high-quality or lower-quality parameters have been satisfied, etc. There can be mechanisms provided in the network and/or at the CPE gateway for determining the capabilities of the originating audio device.

At activity 3220, an audio bandwidth can be selected and/or reserved for the transmission, the selection and/or reservation potentially dependent on the identified capabilities of the transmission participants and/or other relevant factors, whether current, expected, and/or predicted, such as device processing load, network load, quality of service (QOS), latency, jitter, error rates, error correction, redundancy, costs, priorities, channel availability, etc. Where appropriate, multiple audio channels can be selected and/or reserved, for example, to allow stereo sound to be transmitted.

At activity 3230, an audio codec appropriate for the selected audio bandwidth, the transmission participants, and/or the other relevant factors and/or parameters can be selected.

At activity 3300, the audio signal can be processed per the selected audio bandwidth and/or another negotiated processing parameter.

At activity 3400, the audio signal can be transmitted across the network. Note that any transmission can be encrypted and/or authenticated.

Figure 4:
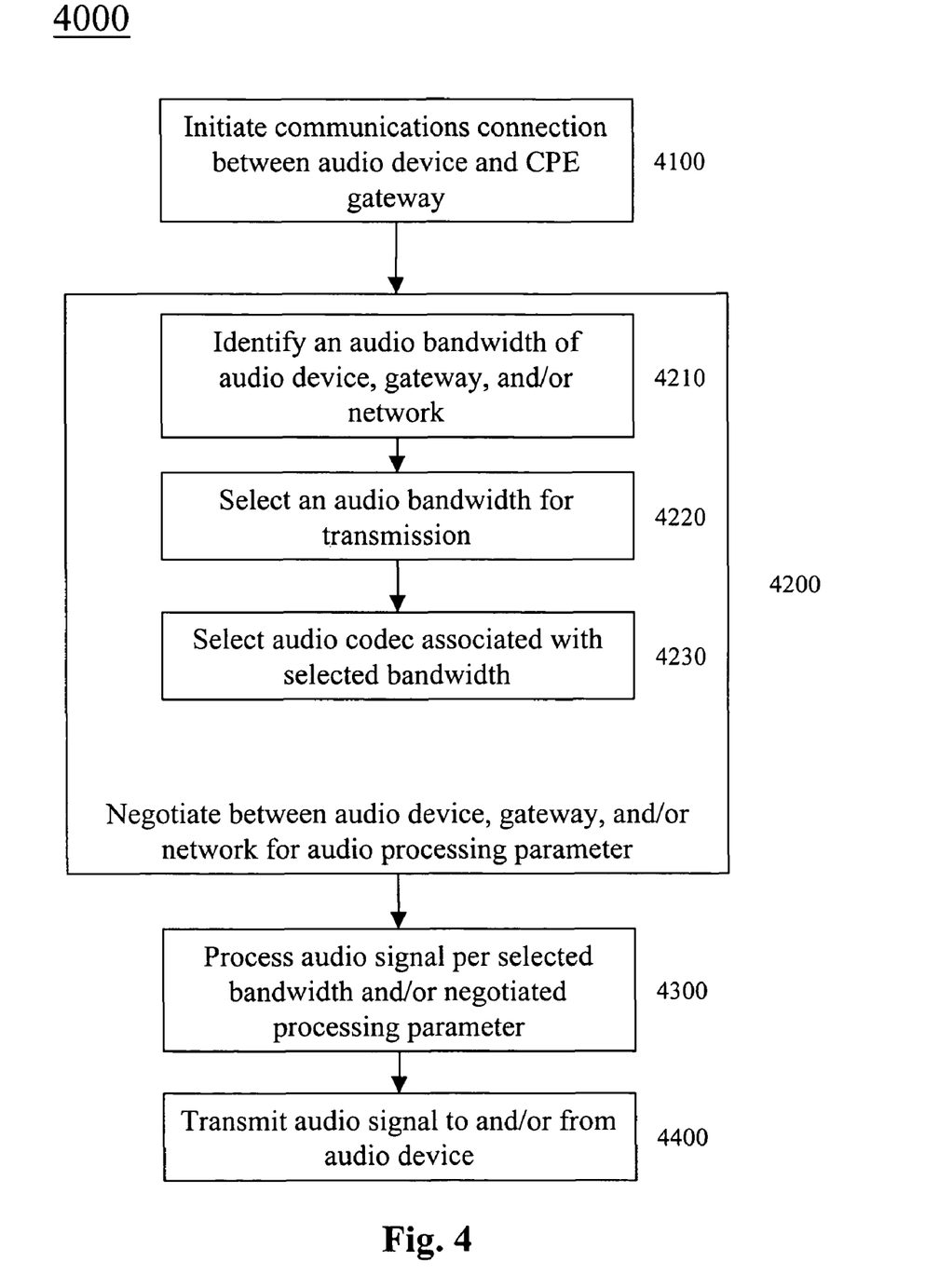
FIG. 4 is a flowchart of an exemplary embodiment of a method 4000.

FIG. 4 is a flowchart of an exemplary embodiment of a method 4000. At activity 4100, communications can be initiated between an audio device and a CPE gateway. During such initiations, certain capabilities of the audio device and/or CPE gateway and/or network can be identified and/or determined, such as via a subscription mechanism. The audio device and/or CPE gateway can be associated with authorized users and/or pre-identified capabilities.

At activity 4200, the audio device and/or gateway can negotiate regarding an audio processing parameter and/or a parameter associated with processing an audio signal to be transmitted and/or in transmission therebetween and/or across the network. The audio signal can correspond to an audio bandwidth selected from a group of potential audio bandwidths, the group including a bandwidth of approximately 3.1 kHz (which corresponds to the bandwidth of traditional telephony devices and/or CPE's) and a bandwidth of at least approximately 6 kHz. Other potential members of the group can be from approximately 3.1 kHz to approximately 48 kHz, including all values and subranges therebetween, including approximately 7 kHz, 10 kHz, 12 kHz, 15 kHz, 20 kHz, 40 kHz, etc. The negotiated bandwidth can vary with respect to time. By including a bandwidth of approximately 3.1 kHz, the CPE gateway can accommodate a transmission involving a traditional "legacy" CPE audio device, such as a traditional analog telephone. That is, the CPE gateway can help "downshift" the audio signal so that the call becomes like any regular call on the legacy network. Alternatively, the CPE gateway can be responsible for and/or request conversion of the legacy voice signal into a higher-class and/or higher bandwidth signal.

At activity 4210, an audio bandwidth capability of each participant in the transmission (e.g., a sending audio device, sending CPE gateway, nodes of the network, the receiving CPE gateway and/or device, a receiving audio device, and/or links and/or connections therebetween, etc.) can be identified. For example, a CPE gateway can request a particular bandwidth from the network, can ask if that bandwidth is available, and/or can indicate the available bandwidth of the CPE and/or an audio device coupled thereto. As another example, a CPE gateway can identify what kind of quality the coupled audio device can accept, what kind of speaker(s) are available at the audio device, whether the audio device is capable of receiving or transmitting stereo or 5.1 or 6.1 sound, whether other high-quality or lower-quality parameters have been satisfied, etc. There can be mechanisms provided in the network and/or at the CPE gateway for determining the capabilities of the originating audio device.

At activity 4220, an audio bandwidth can be selected and/or reserved for the transmission, the selection and/or reservation potentially dependent on the identified capabilities of the transmission participants and/or other relevant factors, whether current, expected, and/or predicted, such as device processing load, network load, quality of service (QOS), latency, jitter, error rates, error correction, redundancy, costs, priorities, channel availability, etc. Where appropriate, multiple audio channels can be selected and/or reserved, for example, to allow stereo sound to be transmitted.

At activity 4230, an audio codec appropriate for the selected audio bandwidth, the transmission participants, and/or the other relevant factors and/or parameters can be selected.

At activity 4300, the audio signal can be processed per the selected audio bandwidth and/or another negotiated processing parameter.

At activity 4400, the audio signal can be transmitted to and/or from the audio device and/or across the network. Note that any transmission can be encrypted and/or authenticated.

Figure 5:
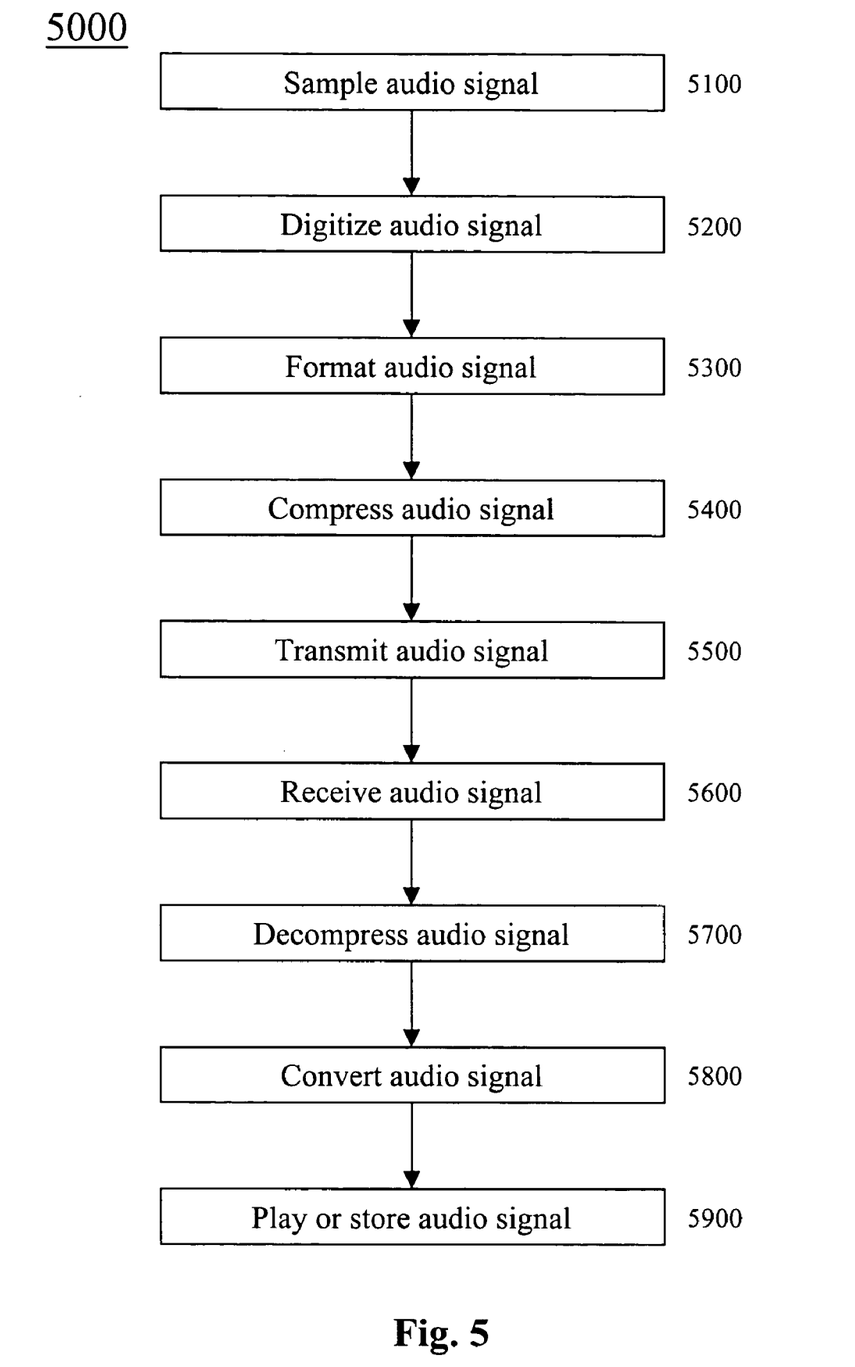
FIG. 5 is a flowchart of an exemplary embodiment of a method 5000.

FIG. 5 is a flowchart of an exemplary embodiment of a method 5000, which can be used for processing an audio signal, such as according to a negotiated parameter. Upon generation of an analog audio signal, at activity 5100, the audio signal can be sampled. At activity 5200, the audio signal can be digitized. At activity 5300, the audio signal can be formatted and/or packetized. At activity 5400, the audio signal can be compressed and/or packetized. At activity 5500, the audio signal can be transmitted, such as to and/or from the audio device, the CPE gateway, and/or across the network. At activity 5600, the audio signal can be received. At activity 5700, the audio signal can be decompressed. At activity 5800, the audio signal can be converted, such as to an analog format. At activity 5900, the audio signal can be played and/or stored. Note that any of activities 5100-5900 can occur by and/or at, for example, an audio device and/or a CPE gateway.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. An apparatus comprising:
    an audio device forming a telephone handset having at least one speaker element and a processor, wherein the audio device is coupled to a consumer premises equipment gateway, which is coupled to a network, and
    wherein the processor of the audio device upon being coupled to the consumer premises equipment gateway immediately negotiates with the consumer premises equipment gateway regarding a parameter associated with processing an audio signal to be transmitted across the network in response to coupling the audio device to the gateway;
    wherein the transmitted audio signal corresponds to a selected audio bandwidth from a plurality of audio bandwidths;
    wherein the selected audio bandwidth is associated with the parameter and is based on a speaker type of the speaker elements determined by the gateway; and
    wherein the plurality of audio bandwidths comprise a first audio bandwidth of approximately 3.1 kHz and a second audio bandwidth of at least approximately 6 kHz.

2. The apparatus of claim 1, wherein the audio device comprises an audio codec.

3. The apparatus of claim 1, wherein the audio device comprises a plurality of audio codecs.

4. The apparatus of claim 1, wherein the audio device is configured to select an audio codec for processing the audio signal according to the negotiated parameter.

5. The apparatus of claim 1, wherein the audio device comprises a telephone.

6. The apparatus of claim 1, wherein the audio device comprises a microphone.

7. The apparatus of claim 1, wherein the audio device comprises a speaker.

8. The apparatus of claim 1, wherein the audio device comprises an acoustic transducer.

9. The apparatus of claim 1, wherein the audio device comprises an audio player.

10. The apparatus of claim 1, wherein the audio device comprises an audio recorder.

11. A machine-implemented method comprising:
    initiating a communications connection between an audio device and a consumer premises equipment gateway coupled to the audio device, and wherein the gateway is coupleable to a network; and
    immediately negotiating between the audio device and the consumer premises equipment gateway for a parameter associated with processing an audio signal to be transmitted across the network in response to coupling the audio device to the consumer premises equipment gateway via a physical port, wherein the transmitted audio signal corresponds to a selected audio bandwidth from a plurality of audio bandwidths, wherein the selected audio bandwidth is associated with the parameter and is based on a speaker type of speaker elements of the audio device, wherein the speaker type is determined by the consumer premises equipment gateway, wherein the plurality of audio bandwidths comprise a first audio bandwidth of approximately 3.1 kHz and a second audio bandwidth of at least approximately 6 kHz.

12. The method of claim 11, further comprising selecting an audio codec for processing the audio signal according to the negotiated parameter.

13. The method of claim 11, further comprising sampling the audio signal according to the parameter.

14. The method of claim 11, further comprising digitizing the audio signal according to the parameter.

15. The method of claim 11, further comprising formatting the audio signal according to the parameter.

16. The method of claim 11, further comprising compressing the audio signal according to the parameter.

17. The method of claim 11, further comprising providing the digitized audio signal to the network according to the parameter.

18. The method of claim 11, further comprising receiving the digitized audio signal from the network according to the parameter.

19. The method of claim 11, further comprising decompressing the audio signal according to the parameter.

20. The method of claim 11, further comprising converting the audio signal according to the parameter.

21. A machine readable medium comprising machine-implementable instructions, which, when loaded in and executed by a processor, cause the processor to perform a method comprising:
 initiating a communications connection between an audio device and a consumer premises equipment gateway coupled to the audio device, and wherein the gateway is coupleable to a network; and
 immediately negotiating between the audio device and the gateway for a parameter associated with processing an audio signal to be transmitted across the network in response to coupling the audio device to the consumer premises equipment gateway via a physical port, wherein the transmitted audio signal corresponds to a selected audio bandwidth from a plurality of audio bandwidths, wherein the selected audio bandwidth is associated with the parameter and is based on a speaker type of speaker elements of the audio device, wherein the speaker type is determined by the consumer premises equipment gateway, wherein the plurality of audio bandwidths comprise a first audio bandwidth of approximately 3.1 kHz and a second audio bandwidth of at least approximately 6 kHz.

22. A machine-implemented method comprising:
 initiating a communications connection between an audio device and a consumer premises equipment gateway coupled to the audio device, and wherein the gateway is coupleable to a network; and
 immediately negotiating between the audio device and the gateway for a parameter associated with processing an audio signal to be transmitted across the network in response to coupling the audio device to the consumer premises equipment gateway via a physical port, wherein the transmitted audio signal corresponds to a selected audio bandwidth from a plurality of audio bandwidths, wherein the selected audio bandwidth is associated with the parameter and is based on a speaker type of speaker elements of the audio device, wherein the speaker type is determined by the computer premises equipment gateway, wherein the plurality of audio bandwidths comprise a first audio bandwidth of approximately 3.1 kHz and a second audio bandwidth of at least approximately 6 kHz and is not larger than an audio bandwidth of the audio device.

* * * * *